Feb. 18, 1969  D. D. DOONAN  3,428,814
PHOTOELECTRIC SYSTEM FOR MEASURING OPTICAL DENSITY
Filed May 26, 1965

DOUGLAS D. DOONAN
INVENTOR

BY Arthur L. Nelson
Frank C. Parker
ATTORNEYS

3,428,814
Patented Feb. 18, 1969

3,428,814
PHOTOELECTRIC SYSTEM FOR MEASURING OPTICAL DENSITY
Douglas D. Doonan, Rochester, N.Y., assignor to Bausch & Lomb Incorporated, Rochester, N.Y., a corporation of New York
Filed May 26, 1965, Ser. No. 458,964
U.S. Cl. 250—214    11 Claims
Int. Cl. H01j 39/12

ABSTRACT OF THE DISCLOSURE

A photoelectric system is disclosed for measuring optical density including a logarithmic converter circuit. The output of the converter circuit is connected to an indicator to provide a reading corresponding to the density and/or integral of density.

---

This invention relates to electrophoresis and more particularly to an electrical circuit for an electrophoretic process.

Various methods have been proposed for electrophoretic analysis. A preferred proceess which provides consistently accurate results utilizes a semi-fluid medium on a migration table of the analytical instrument. The separation of the particles, or fractions of the sample is achieved by applying a potential gradient across the medium. The potential gradient is maintained for a sufficient period of time to migrate the various fractions in the protein, enzyme, or various other samples which may be analyzed. Subsequent to the migration step in the process a scanning device is used to scan the migrated fractions on the migration table. It is necessary that an accurate readout be provided during the scanning and the simultaneous readout and recording of the analyzed sample. Accordingly this invention is intended to provide such an accurate readout and recording device for an electrophoretic analysis.

It is an object of this invention to provide radiation sensing and recording circuits for an electrophoretic process.

It is another object of this invention to provide a readout proportional to the logarithm of the transmittance through the migrated fractions in an electrophoretic analysis.

It is a further object of this invention to provide a temperature compensated circuit for reading the density, and also for integrating the reading in an electrophoretic process.

It is a further object of this invention to provide a preset control so as to establish the total integral of the density curve at 100% on the readout.

The objects of this invention are accomplished by providing an electrical circuit having a radiation sensor sensing the transmittance, at a predetermined wavelength or wavelengths, of radiation passing through an absorbing sample during the scanning process. An output signal which is proportional to the logarithm of the transmittance is accomplished by a logarithmic converter and the signal is then amplified and recorded.

Means in the electrical circuit is provided for sensing the density of the various fractions in the migrated sample, recording the density of the various fractions, recording the integral of the density of the various fractions, and also providing a 100% set control so that the integral is consequently normalized to 100% on the readout.

The preferred embodiments of this invention are described in the subsequent paragraphs and illustrated in the attached drawings which include the following figures.

Figure 1:
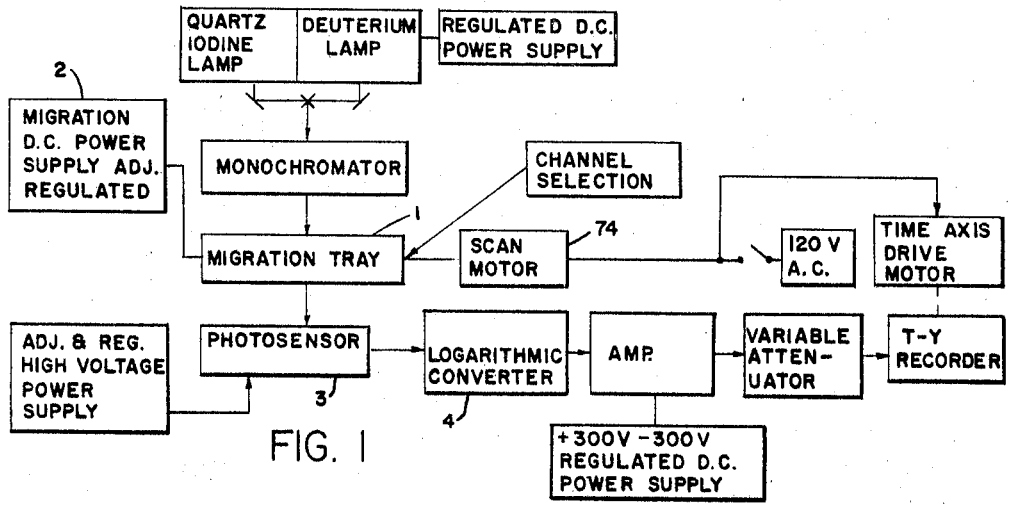
FIG. 1 illustrates a block diagram for providing an electrophoretic process.

An electrophoretic process which the subsequently described electrical circuit adapts itself well is illustrated in FIG. 1. The electrical circuit includes a photomultiplier tube which senses the transmittance of light radiated by a lamp through a monochromator which is then directed through the migration tray and falls on the photomultiplier tube.

The light energy falling on the photomultiplier cathode is converted to photo electrons. It is understood that light referred to in this description may be in the visible or invisible spectrum and the use of the terms photo and light are merely illustrative and not limitative. These photo electrons are collected and amplified by the dynodes in the photomultiplier tube. The gain is constant, and depends on the dynode string voltage. A well regulated and low ripple power supply is provided to supply the dynode string.

The photomultiplier anode current, then, is proportional to the number of photons falling on the photo cathode. It is required that the output readout be proportional to the logarithm of the number of photons. The conversion from the direct proportion to the logarithmic relation is accomplished via a selected silicon transistor.

The current through the silicon transistor (emitter-base junction) is related to the voltage across it by $$I = I_s (\exp. eV/kt - 1) \quad (1)$$

$I_s$ = reverse saturation current
$e$ = electronic charge
$k$ = Boltzmann's constant
$t$ = ° K.
$V$ = applied voltage across junction at room temp.
Then for $t = 300°$ K.

$$I = I_s (\exp. 39V - 1)$$

When the voltage across junction exceeds 0.1 volt, then $$I = I_s \exp. 39V$$

Taking the logarithm of both sides $$\text{Log } I = \log I_s + 39V \log (\exp.)$$

$$\text{Log } I = \log I_s + 16.9V$$

For the practical junction where the saturation current is in the order of $10^{-11}$ amperes, $$\text{Log } I = -11 + 16.9V$$

or $$\text{Log } I = 16.9V - 11 = AV + B$$

where A and B are constants.

This says that the voltage V across the junction is proportional to the logarithm of the current through it.

When the transistor is connected between the anode of the photomultiplier tube and ground, the voltage drop across the junction will be the logarithm of the photomultiplier current hence the logarithm of the number of photons falling on the cathode of the photomultiplier tube. This meets the requirement stated earlier.

Temperature variation of the transistor junction, causes the voltage across the junction to vary. This is due to the temperature ($t$) term in the exponential. See Equation 1. This requires that the junction be thermally stable or temperature compensated to eliminate drift. It was determined that a differential measurement should be made between a "reference" transistor and the "measure" transistor. The current through the "reference" transistor is controllable by an absorbance zero adjustment. If both the "reference" and "measure" transistor are kept at the same temperature then the variation in the log converter output, due to temperature changes would be minimized.

The two transistors are mounted, in a plug-in can, by German silver wire leads that are six inches long. These are coiled to reduce the overall length of the assembly. German silver was chosen because of its low thermal conductivity and its easy solderability. With this arrangement the thermal drift is practically eliminated.

The difference measurement is made by first connecting the input (of the amplifier) to the "reference" transistor and then connecting the input to the "measure" transistor. If the photomultiplier current is such that the voltage drop across the "measure" transistor is equal to the voltage drop across the "reference" transistor then the input to the amplifier is zero. As soon as the photomultiplier current changes, the voltage drop across the "measure" transistor will change, with the result that the voltage input to the amplifier increases. The sampling time of the reference or the measure transistor is determined by the modulator.

The AC signal at the output of the modulator is connected to the amplifier input. This stage has fixed gain. The output of this stage is coupled to the "coarse" gain control, and then connected back to the output section of the modulator through a condenser where the signal is rectified. The rectified signal then goes through a voltage divider which provides the "fine" gain control. The signal then is filtered and fed to the recorder input. The output of the first amplifier is also connected to the input to the second amplifier. The output of the second amplifier is then connected to the output section of the modulator where it is rectified. The rectified signal then goes to the integrator. The output of the integrator is then connected to the recorder input.

The recorder sensitivity is constant when it is recording "Density," and the sensitivity is variable when in the "Integrate" position. This variable sensitivity is brought about by varying the voltage from the feedback potentiometer of the recorder and at the same time, varying the gain of the servo pre-amplifier in the recorder to maintain recorder stability and dead zone.

The photomultiplier anode current can be as low as 0.1 $\mu a$. At this current the voltage across the transistor junction will be about 0.45 volt. This results in a source impedance of 4.5 megohms. Any loading of the junction will change the logarithmic characteristics of the transistors. This then requires an extremely high input impedance to the amplifier hence, a cathode follower input is used. Satisfactory operation can be obtained if the DC input impedance of the first amplifier is 500 megohms or higher.

The output of the integrator amplifier is connected to a relay which is closed only during the scanning period. During the scan the amplified signal is fed to an RC integrator whose time constant is very large thereby resulting in minimum error. The voltage developed across the integrating capacitor is fed directly to the input of the recorder. The integrator reset switch shorts the capacitor.

With 10 $\mu a$. flowing through the measure transistor converter, the voltage across it is approximately 0.55 volt. The polarity is negative at the photomultiplier anode end of the transistor. In order to make the modulated voltage zero at the input of the amplifier, proper bias must be added to the "reference" transistor so that the output voltages of both transistors are the same. Obviously any drift in the bias supply will cause a signal that will cause drift in the density trace and in the integral.

Referring to FIG. 1 a process for electrophoresis is illustrated. A test sample is deposited on a migration tray 1 which is migrated by application of a potential applied to the migration tray from the migration power supply 2 which produces a potential gradient across the tray to provide migration of the various fractions of the sample deposited on the tray. A plurality of channels are provided on the tray in accordance with the specific requirements of the process. The general description of this process is more specifically set forth in a copending patent application of the same assignee entitled Electrophoretic Process, Ser. No. 444,616, by Royden N. Rand.

Subsequent to migration of the fractions of each sample which is deposited on each channel, each channel is selectively and alternatively scanned in response to movement of the tray by the scanning motor. Simultaneously with the movement of the migration tray during the scanning step a time axis drive motor also drives the recorder pen on a recoder. The lamp used may be either a quartz iodine lamp, or deuterium lamp as illustrated, radiating light through a monochromator, which directs radiation through the migration tray and the electrophoretic medium. The magnitude of the transmitted radiation passing through the various fractions of the migrated sample is then sensed by the photomultiplier tube 3. The photomultiplier tube 3 supplies an electrical signal, which is generated in response to radiation impinging on the photomultiplier tube, to the logarithmic converter 4. The readout may be either in the form of a density reading or an integral of the density reading in accordance with the control switches in the readout system. Generally this readout is illustrated in the block diagram of FIG. 1 and more specifically illustrated in FIG. 2 where the basic components of the electrical circuit are schematically illustrated.

Figure 2:
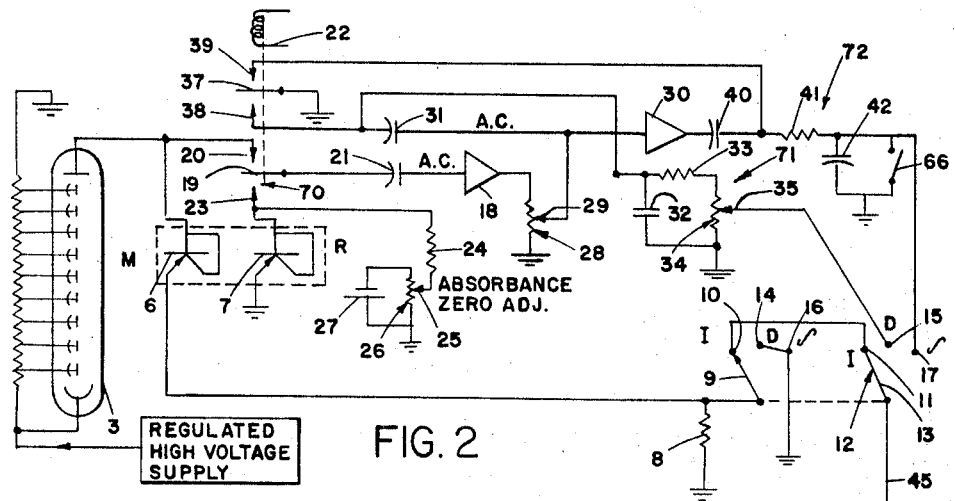
FIG. 2 is an electrical circuit to provide a readout and recording for the electrophoretic process.

Referring to FIG. 2 the photomultiplier tube 3 receives a radiation signal responsive to the transmittance of radiation passing through the migration tray, which is carrying the various migrated fractions of the test sample. The photomultiplier tube 3 is operated by a regulated constant high voltage supply. A constant voltage on the photomultiplier tube provides a constant gain on the photomultiplier tube and the output signal is directly proportional to the radiation falling on the photomultiplier cathode and the signal is therefore directly proportional to the transmittance. As previously discussed any temperature variation on the logarithmic converter, which is a transistor connected as shown, will produce a variation in signal output. Accordingly the "measure" transistor 6 and the "reference" transistor 7 will compensate for variations in the signal responsive to temperature variations.

The measure transistor 6 is connected with its base to the anode of the photomultiplier tube 3 and its collector, and emitter connected through a resistor 8 to ground. The conductor intermediate the transistor 6 and the resistor 8 is connected to a switch arm 9. The switch arm 9 may be rotated through three contact positions of which the first contact is 10 which provides reading of the photomultiplier current which may be recorded. The contact 10 is also connected to the contact 11 of the second section of the gang connected switch 12 which includes a switch arm 13.

The switch arms 9 and 13 may also be rotated to a middle position to engage the contacts 14 and 15 respectively. The contacts 14 and 15 provide a reading on the recorder of the density of the migrated fractions on the migration tray.

The switch arms 9 and 13 may also be further rotated to engage the contacts 16 and 17 which provides the integral of the density readout.

The photomultiplier 3 generates a signal responsive to the transmittance through the migrated sample which is applied to the amplifier 18 when the modulator arm 19 is in the upper position and engaging the contact 20. The signal is applied through the capacitor 21 to the amplifier 18 in this position. The modulator arm 19 is actuated by the coil 22 which is actuated by a source of alternating voltage. When the modulator arm 19 is depressed it engages the contact arm 23 and applies a signal from the "reference" transistor 7 through the capacitor 21 to the amplifier 18. The current flowing through the "reference"

transistor 7 is controlled by the magnitude of the resistor 24 and the contact position of the slider arm 25 of the potentiometer 26. The constant source of potential 27 is applied across the potentiometer. The source of constant potential 27 may be a mercury cell, or a nickel cadmium cell or any suitable source of constant potential. The zero adjust is manually adjusted by positioning the slider contact 25 on the potentiometer 26 so that the differential of signals applied to the amplifier 18 is zero. The gang switch 12 is in the "photomultiplier current" position wherein the arms 9 and 13 are engaging the contacts 10 and 11 respectively to indicate the proper setting.

The modulator as shown is of the electro-mechanical type, however, intermittent lights with photo cells may be used, or any suitable modulator providing the function as shown may be used. The inventor does not wish to limit the modulator to the type shown.

The output voltage of the amplifier 18 is produced across the resistor 28 of which a portion from the contact of the slider arm 29 is fed to the input of the amplifier 30. In the density position of switch 12 the output of the amplifier 18 is applied through the capacitor 31 to the filtering circuit consisting of the capacitor 32, resistor 33, and the potentiometer 34. The potentiometer slider arm 35 receives a signal which is fed to the contact 15 and into the Y–T recorder 36.

A second portion of modulator is also actuated by the coil 22 in which the modulator arm 37 rectifies the signal from the output of the amplifier 18 when the modulator arm 37 is in its lower position engaging the contact 38. When the modulator arm 37 is in the upper position and engages the contact arm 39 the output of the amplifier 30, which passes through the capacitor 40, is then rectified. This set of contacts 37, 38, 39 provide synchronous rectification for the signals.

When the switch 12 is in the integrate position and the arms 9 and 13 are engaging the contacts 16 and 17 respectively, the output from the amplifier 30 is fed through the capacitor 40 and resistor 41 to capacitor 42. The capacitor 42 is constantly integrating the output from amplifier 30 when the switch 12 is in either the integrate or density position. The integrated readout is fed to the Y–T recorder when the switch is in the integrate position.

Figure 3:
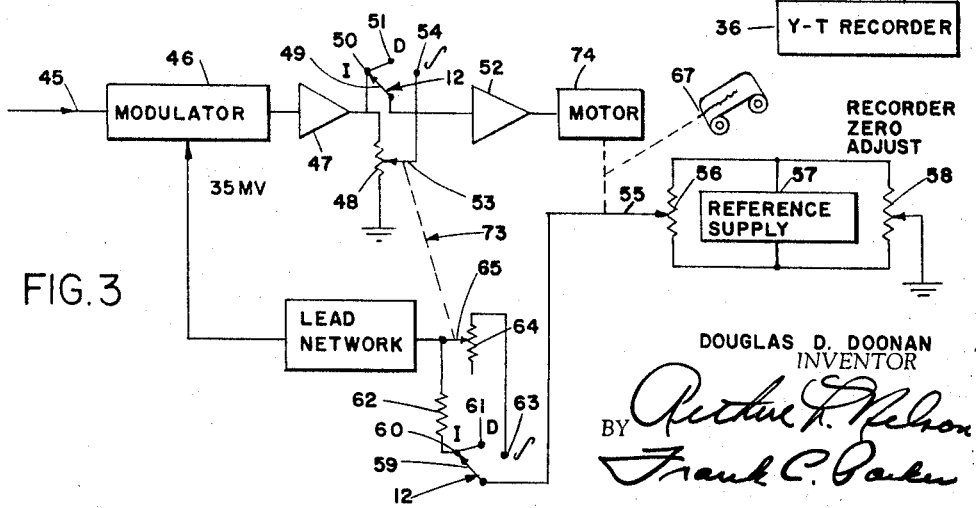
FIG. 3 illustrates a gain control and feedback circuit which provides normalizing to 100% for the integral readout.

The integrate position will be more specifically discussed in the subsequent paragraphs describing FIG. 3.

Referring to FIG. 3 a feedback circuit is illustrated which has a variable amplification control and a variable feedback control which allows the operator to set the integral of the density to 100% on the readout. The conductor 45 which connects to the Y–T recorder is illustrated in FIG. 2 and FIG. 3. The circuit of FIG. 3 is not illustrated in FIG. 2 although it is included in the circuit for recording in the density positions for the electrical circuit. The conductor 45 feeds into a modulator 46 which in turn feeds into the preamplifier 47. The output of the preamplifier 47 is impressed across the potentiometer 48. The switch 12 previously discussed with FIG. 2 is also gang connected to the switch arm 49 shown in FIG. 3. When the switch arm 49 is engaging the contacts 50 and 51 the total amount of the output from the preamplifier 47 is applied to the amplifier 52. When the switch arm 49 is rotated to engage the contact 54 the signal is applied across the potentiometer 48 and a variable portion of the output signal across the potentiometer 48 is then applied to the amplifier 52 in accordance with the position of the contact 53 on the potentiometer 48. The amplifier 52 is connected to the control winding of a two phase servo motor 74. The second winding of the motor 74 is connected to a suitable source of electrical energy. The drive shaft of the servo motor 74 is connected to a pen 67 which records the output on a recording device. The output shaft also drives the slider arm 55 to a null position on the potentiometer 56. The voltage impressed across the potentiometer 56 is supplied by the reference supply 57 and a zero adjust resistor 58 for the recorder readout, is also connected across the supply.

The motor 74 drives towards the null position until the feedback to the modulator 46 is equal to the input signal applied to the modulator on the conductor 45.

The amount of feedback applied to the modulator 46 is determined by the position of the slider arm 55 on the potentiometer 56. The switch 12 also has a gang connection for the arm 59 which engages the contact 60 in the photomultiplier current position and the contact 61 in the density readout position of switch 12. In these positions the total resistance 62 is connected to the lead network to provide feedback to the modulator 46. When the switch arm 59 of switch 12 is rotated to engage the contact 63, in the integrate position, the variable resistor 64 is then connected into the feedback circuit. The contact 65 is moved to vary the amount of resistance in the feedback circuit. By increasing the resistance 64 in the feedback circuit the magnitude of the signal fed back to the modulator is decreased and consequently decreases the voltage required at conductor 45 to drive the readout to 100%. With a decrease in the resistance 64 a greater signal is fed back to the modulator thus requiring more voltage at conductor 45 to drive the readout to 100%. As the feedback is changed, oscillations may occur in the circuit and accordingly the signal applied to the amplifier 52 is decreased to prevent oscillations. The slider arm 53 and the slider arm 65 are ganged together to provide a simultaneous adjustment. The full scale response of the readout is regulated by the positions of contact arms 53 and 65. Thus the total integrated reading of density can be set to 100%.

This setting is accomplished by connecting the contact 17 to the switch arm 13 of switch 12 subsequent to a density reading. The switch 66 is open during the density pattern readout. This causes the capacitor 42 to charge providing an integration of the total scan. When the switch 12 is rotated to the integrate position the charge on the capacitor 42 is applied across the high impedance input to the modulator 46 and the control for the arms 52 and 65 are then rotated to position the pen 67 to the 100% position on the chart. The switch 66 is then momentarily closed and the capacitor 42 is discharged. The scanning mechanism is caused to scan thus causing the capacitor 42 to again integrate during the scanning cycle. The integration reading will begin from a zero point and end at 100% and give the operator an accurate picture of the percentage of the various fractions of the sample as the scanning device runs through the scanning cycle.

The operation of the device will be described in the following paragraphs. The electrophoresis analyzing circuit described in this application adapts itself well to analyzing an electrophoresis process as described in the copending patent application identified above. Subsequent to the migration of the sample on the migration tray the circuit described herein is then energized by suitable power supplies. The channel selector will then select one of the plurality of channels which is to be scanned by the scanning device. A monochromator with a suitable source of radiation is used in scanning the migrated sample on the migration tray. The radiation from the monochromator is directed through the migration tray upon which the various fractions have been migrated. The photomultiplier tube 3 senses a radiation signal responsive to the magnitude of radiation passing through the various fractions on the migration tray. The circuit illustrated in FIG. 2 prior to an analysis is preset by the zero adjust 25 which controls the reference transistor 7 to provide zero difference signal applied to the amplifier 18.

With switch 12 in photomultiplier position the recorder is connected across resistor 8. The voltage drop across this resistor is proportional to the photomultiplier anode current. The position is used primarily to adjust the photomultiplier current to within the prescribed limits.

It is understood that the inventor does not wish to limit the logarithmic converter device to a transistor. A silicon diode, a germanium diode, or any other devices may provide a similar output, however, the transistors as shown is merely a preferred disclosure of a logarithmic converting means.

The circuit is adjusted to provide the desired voltage setting of the two transistors when the switch 12 is rotated so that the arms on the switch are set at the density position. The scanning motor is energized and caused to move the migration tray intermediate the monochromator and the photomultiplier tube, and the time axis drive motor drive the recording pen. The photomultiplier tube senses the magnitude of radiation impinging on the cathode and generates a signal which is applied to the contact 20. The modulator 70 applies alternate voltages from the contacts 20 and 23 to the amplifier 18. The amplifier 18 provides an output across the potentiometer 28 of which a portion is then applied to the amplifier 30 by means of the sliding contact 29 on potentiometer 28. The output from the contact arm 29 is also applied through the capacitor 31 to the filtering circuit 71. A portion of the output from the filtering circuit 71 is then applied to the contact 15 by means of a slider arm of the potentiometer 34. The density reading will then be recorded by the Y–T recorder. The scanning motor drives the scanning device to scan the length of the migration tray for the channel selected and then stops.

During the scanning of the sample the integrating circuit 72 is continuously integrating the output of the amplifier 30 and this integration is represented by the charge on the capacitor 42. During the integration process the switch 66 is open. Subsequent to completion of the scanning and determination of the density pattern which was recorded by the suitable recording instrument the switch 12 is rotated to the integrate position. In this position the potential created by the charge on the capacitor 42 is applied through the high impedance input through the modulator 46. By controlling the positions of the slider arms 53 and 65 of the 100% control 73, the 100% position for the pen 67 is set. As the control 73 is rotated the feedback circuit shown in FIG. 3 will automatically drive the motor 74 to set the pen 67 to 100% position.

Momentarily the switch 66 is then closed thereby discharging the capacitor 42. The scan motor 74 is then energized and caused to rotate in the reverse direction to cause the radiation to reverse scan the migration tray and the radiation sensed by the photomultiplier to generate a signal which is integrated. The function of the circuit illustrated in FIG. 2 is basically the same except the circuit is integrating and the readout is recording the integral of the density instead of the density pattern itself. The feedback circuit illustrated in FIG. 3 causes the motor to drive the pen 67 and the potentiometer slider arm 55 to maintain a null position on the potentiometer 56. As the scan of the radiation on the migration tray goes to a completion the pen will end at a 100% position on the chart. This provides the operator of the instrument a means of determining percentages directly off the recording of any fraction in a sample. For instance there may be at least a half dozen various fractions which may be of interest to the operator and the integration curve will immediately present a picture of the percentage of each of the various fractions scanned by the device. Accordingly this eliminates any need for calculation or guesswork in determining the complete picture of the integrated readout.

The preferred embodiment of this invention has been illustrated and described and it is understood that other embodiments may be devised which would fall within the scope of the invention which is defined by the attached claims.

I claim:

1. An electrical circuit for measuring density comprising a photosensor for sensing the magnitude of radiation directed through a chamber for receiving a radiation absorbing sample and generating an electrical signal responsive thereto, a semiconductor measure logarithmic converter circuit coupled to receive said electrical signal from said photosensor for producing a signal that is a logarithmic function of said electrical signal, a semiconductor reference logarithmic converter circuit producing a temperature compensating reference signal, and circuit means alternately sampling signals from said measure and reference converter circuits to produce a temperature compensated logarithmic signal corresponding to the density of said sample.

2. An electrical circuit for use with optical density measuring apparatus comprising a photosensor for sensing the magnitude of radiation directed through a radiation absorbing sample and generating an electrical signal responsive thereto, a measure logarithmic converter circuit receiving the electrical signal from said photosensor and producing a measure signal proportional to the logarithm of the photosensor signal, a reference logarithmic converter circuit producing a reference signal, circuit means receiving alternate signals from said measure and reference converters for producing a signal that is a function of the difference in magnitude of the signals from the measure and reference converters, and an indicator receiving the difference signal to provide an indication of the density of the radiation absorbing sample.

3. An electrical circuit for use with electrophoresis comprising a photosensor for sensing the magnitude of radiation directed through a migrated sample and generating a signal responsive thereto, a measuring logarithmic converter receiving the signal from said photosensor and producing a measure signal proportional to the logarithm of the signal received from said converter, a reference logarithmic converter producing a reference signal, a modulator alternately sampling a signal from said measuring logarithmic converter and said reference logarithmic converter, an amplifier receiving said signals and producing a signal equal to the difference in magnitude of the signals from said measuring logarithmic converter and said reference logarithmic converter and amplifying the difference signal, an indicator receiving said amplified difference signal to provide an indication of the density of said migrated sample.

4. An electrical circuit for use with electrophoresis comprising a source of radiation directing radiation through a migrated electrophoresis sample, a photosensor sensing the magnitude of radiation transmitted through the migrated sample and generating an electrical signal responsive thereto, a measure logarithmic converter receiving an electrical signal from said photosensor and producing a measure signal proportional to the logarithm of the radiation sensed, a reference logarithmic converter generating a reference signal, means for maintaining said logarithmic converters at substantially the same temperature, a modulator sampling the output signal from each of said converters, an amplifier receiving said converter signals from said modulator and generating a difference signal equal to the difference in magnitude of said converter signals and for amplifying said difference signal, an indicator receiving the amplified signal to provide an indication of the density of the radiated electrophoretic sample, an integrator circuit receiving a signal from said amplifier for simultaneously integrating the amplified signal in said amplifier while simultaneously recording the density of said electrophoretic sample.

5. An electrical circuit for use with electrophoresis comprising a source of radiation for directing radiation through a migrated electrophoretic sample, means supporting said sample, a photosensor sensing the magnitude of radiation directed through a portion of the migrated sample and generating an electrical signal responsive to the transmitted radiation, means for producing relative motion between said migrated sample and said photosensor, a measuring logarithmic converter receiving an electrical signal from said photosensor and producing a voltage proportional to the logarithmic of radiation sensed, a reference logarithmic converter having means for adjusting the bias on said converter for generating a reference signal, means maintaining the temperature of said converters substantially equal, circuit means alternately sampling a signal from said measuring logarithmic converter and said reference logarithmic converter and producing a difference signal equal to the difference of said two signals, an amplifier receiving the different signal from said modulator and amplifying said signal, a density readout circuit including a filter network receiving a signal from said amplifier and indicating the density of the various fractions of said migrated sample.

6. An electrical circuit for use with electrophoresis comprising a source of radiation for directing radiation through a migrated electrophoretic sample, means for supporting the sample, a photosensor for continuously sensing the magnitude of radiation transmitted through a portion of the migrated fractions of said sample, means for providing relative movement between said migrated sample and said photosensor to thereby provide means for scanning the length of migration of the sample, a measure logarithmic converter receiving an electrical signal from said photosensor and producing a signal proportional to the logarithm of the radiation sense by the photosensor, a reference logarithmic converter for generating a reference signal from said reference converter, circuit means alternately sampling the signal from said measure logarithmic converter and said reference logarithmic converter, an amplifier receiving a difference signal equal to the difference of the signal from said measuring logarithmic converter and said reference logarithmic converter and amplifying said difference signal, an indicator receiving said amplified signal and providing an indication of the density of the various fractions of said migrated sample, an integrator circuit including an RC circuit for simultaneously integrating during scanning of the migrated sample to thereby provide means for integrating while simultaneously reading the density of said electrophoretic sample.

7. An electrical readout circuit comprising a source of radiation for directing radiation through a sample, means for supporting said sample, a photosensor for sensing a portion of the radiation transmitted through said sample and generating a signal responsive to the radiation falling on said photosensor, a scanning motor for providing relative movement between said sample and said photosensor, a logarithmic converter receiving an electrical signal from said photosensor and producing a signal proportional to the logarithm of radiation falling on said photosensor, amplifying means receiving said signal from said converter and amplifying said signal, a recorder recording the amplified signal received from said amplifier, an integrator including an RC circuit for simultaneously integrating and holding the signal as the sample is scanned, means presetting the integrated signal at 100% on the recorder upon completion of scan, means for recording the integral of the amplified signal to thereby record from zero of the beginning of a scan to 100% at completion of scan.

8. A readout circuit for use with electrophoresis comprising, a source of radiation directing radiation through a migrated electrophoresis sample, means supporting said migrated sample, a photosensor sensing the magnitude of radiation transmitted through a portion of said migrated sample and generating an electrical signal responsive to the radiation, means providing relative movement between said migrated sample and said photosensor, a logarithmic converter receiving an electrical signal from said photosensor and producing a signal proportional to the logarithm of radiation received by said photosensor, an amplifier means receiving a signal from said converter and amplifying said signal, an integrator including an RC circuit for integrating and holding the signal from said amplifier, a recorder connected to said amplifier for recording the density of the migrated sample while said signal is being integrated, a feedback circuit connected in said recorder for feeding back a signal to control the magnitude of the recorded signal, a variable gain circuit connected to said feedback circuit to control the amplification for presetting the integrated signal at 100%, means for subsequently integrating and recording the signal to thereby indicate the percentage of the total integrated signal included in each of the various fractions of said migrated sample.

9. An electrical circuit for use in electrophoresis comprising, a source of radiation for directing radiation through a migrated sample, means for supporting said sample, a photosensor for sensing the radiation transmitted through a portion of said sample and generating the signal responsive to the radiation falling on said photosensor, a scanning motor for providing relative movement between said sample and said photosensor, a logarithmic converter receiving a signal from said photosensor and producing a signal proportional to the logarithm of radiation falling on said photosensor, amplifier means receiving the signal from said converter and for amplifying the logarithmic signal, an integrator receiving the amplified logarithmic signal from said amplifier for integrating and holding the signal as the sample is scanned, a recorder input circuit, a variable gain amplifier coupled to said input circuit, a recorder drive having a potentiometer for recording the signal from said variable gain amplifier, a variable attenuating feedback circuit connected between said potentiometer and said input circuit for feeding back an attenuated signal to said input circuit, and switch means for connecting said input circuit to said amplifier means for recording the migration of said sample while said integrator simultaneously integrates and holds said amplified signal for providing a total integrated signal for setting the recorder value and for subsequently connecting said input circuit to said integrator for recording an integrated signal during a subsequent scan.

10. An electrical readout circuit for use with electrophoresis comprising a source of radiation for directing radiation through a migrated sample, means for supporting said sample, a photosensor sensing the radiation transmitted through a portion of said sample and generating a signal responsive to the radiation falling on said photosensor, scanning means for providing relative movement between said sample and said photosensor, a logarithmic converter receiving an electrical signal from said photosensor for producing a signal proportional to the logiarithm of radiation falling on said photosensor, amplifying means receiving said signal from said converter and amplifying said signal, an integrator for simultaneously integrating and holding the signal from said amplifier as said sample is scanned, a recorder input circuit, a recorder drive, a variable gain circuit coupled between said input circuit and said recorder drive, a variable attenuating feedback circuit for feeding back a signal from said recorder drive to said input circuit, means for simultaneously varying the gain of said variable gain circuit and varying the attenuation of said feedback circuit for presetting the total integrated signal on the recorder to any desired value, and switching means for selectively and alternatively connecting the amplifying means and the integrator circuit to said input circuit to record the migration of said sample in one scan of said sample and to record the integral of the migration of said sample from zero to the desired value during subsequent scanning on said sample.

11. An electrical readout circuit for use in electrophoresis comprising, a source of radiation for directing radiation through a migrated electrophoretic sample, means for supporting said migrated sample, scanning means for providing relative movements between said migrated sample and the combination of said source and photosensor, a photosensor for sensing the radiation transmitted through a portion of said sample and generating a signal responsive to the radiation falling on said photosensor, a logarithmic converter receiving an electrical signal from said photosensor and producing a signal proportional to the logarithm of radiation falling on said photosensor, or amplifying means receiving the signal from said converter and amplifying said logarithmic signal, an integrator circuit connected to said amplifier for integrating and holding the amplified logarithmic signal from said amplifier throughout a scanning of said migrated means and said integrator circuit, a variable gain circuit coupled to said input circuit, a recorder drive including a potentiometer connected to said variable gain circuit for recording the density of radiation as indicated by the signal received from said variable gain circuit, a variable attenuation network feeding back a signal from said potentiometer to said input circuit to generate a zero difference signal from the output of said input circuit when the signal from said switching means and the feedback signal are equal, means for coupling the variable gain circuit and variable attenuation circuit together to simultaneously control the magnitude of the recorded signal for presetting the integral-of-density signal from said integrator circuit at 100% in one scan of said migrated sample to thereby provide subsequent recording from zero to 100% during subsequent scanning of the migrated sample.

References Cited

UNITED STATES PATENTS

| | | | |
|---|---|---|---|
| 2,995,978 | 8/1961 | Glandon et al. | 250—207 X |
| 3,031,917 | 5/1962 | Pelavin | 88—14 |
| 3,076,375 | 2/1963 | Donnell | 88—14 |
| 3,096,137 | 7/1963 | Silard | 346—32 |
| 3,102,202 | 8/1963 | Sweet | 250—207 |
| 3,208,265 | 9/1965 | Rutledge | 88—14 |
| 3,226,556 | 12/1965 | Rosin | 250—218 X |
| 3,320,149 | 5/1967 | Isreel, | 88—14 |
| 3,346,478 | 10/1967 | Wiedemann | 88—14 |

OTHER REFERENCES

"Disc Electrophoresis," advertising brochure of Canal Industrial Corp., 4935 Cordell Ave., Bethesda 14, Md., Received Oct. 7, 1964, 4 pp.

RALPH G. NILSON, *Primary Examiner.*

M. A. LEAVITT, *Assistant Examiner.*

U.S. Cl. X.R.

88—14; 346—32

UNITED STATES PATENT OFFICE
CERTIFICATE OF CORRECTION

Patent No. 3,428,814                                              February 18, 1969

Douglas D. Doonan

It is certified that error appears in the above identified patent and that said Letters Patent are hereby corrected as shown below:

Column 11, line 4, cancel "or"; between lines 8 and 9 insert -- sample, a recorder input circuit, switching means for selectively connecting said input circuit to said amplifying --.

Signed and sealed this 14th day of April 1970.

(SEAL)
Attest:

Edward M. Fletcher, Jr.                                  WILLIAM E. SCHUYLER, JR.

Attesting Officer                                                       Commissioner of Patents